US012684633B2

(12) United States Patent
 Colom Ikuno

(10) Patent No.: US 12,684,633 B2
(45) Date of Patent: Jul. 14, 2026

(54) GROUPING AND PRIORITIZING OF DISSIMILAR PDU SESSIONS IN A TELECOMMUNICATIONS SYSTEM

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 255 days.

(21) Appl. No.: 18/574,840

(22) PCT Filed: Jun. 23, 2022

(86) PCT No.: PCT/EP2022/067153
§ 371 (c)(1),
(2) Date: Dec. 28, 2023

(87) PCT Pub. No.: WO2023/274831
PCT Pub. Date: Jan. 5, 2023

(65) Prior Publication Data
US 2024/0334507 A1    Oct. 3, 2024

(30) Foreign Application Priority Data
Jul. 1, 2021    (EP) ..................................... 21183188

(51) Int. Cl.
*H04W 76/11*        (2018.01)
*H04W 76/15*        (2018.01)
(52) U.S. Cl.
CPC ............ *H04W 76/11* (2018.02); *H04W 76/15* (2018.02)
(58) Field of Classification Search
None
See application file for complete search history.

(56) References Cited

U.S. PATENT DOCUMENTS

2018/0192472 A1*   7/2018   Callard ............... H04L 49/9063
2019/0007921 A1    1/2019   Schliwa-Bertling et al.
(Continued)

FOREIGN PATENT DOCUMENTS

CN    109644419 A    4/2019
CN    110495214 A    11/2019
(Continued)

OTHER PUBLICATIONS

LG Electronics et al, "ATSSS Solution - Update of Solution 2", Sanya, China; 3GPP Draft; S2-183579_ATSSS_SOLUTION—Update of Solution 2_R6, 3rd Generation Partnership Project (3GPP), Mobile Competence Centre; Apr. 10, 2018 (Apr. 10, 2018), pp. 1-7, vol. {0} SA WG2, No. {0}, 650, Route Des Lucioles; F-06921 Sophia-Antipolis Cedex; France, Retrieved from the Internet: URL: http://www.3gpp.org/ftp/tsg%5tea/WG2%5FArch/TSGS2%5F127% 5FSanya/Docs/, XP051437880, [retrieved on 2018-04-10].
(Continued)

*Primary Examiner* — Andre Tacdiran
(74) *Attorney, Agent, or Firm* — LEYDIG, VOIT & MAYER, LTD.

(57)        ABSTRACT

A telecommunications system includes: a user equipment; one or more access networks (ANs); a core network (CN); and one or more data networks (DNs). The one or more ANs are configured to provide the UE access to the CN. The CN is configured to provide connectivity to the one or more DNs. The UE is configured to access the one or more DNs by using different protocol data unit (PDU) sessions, established between the UE and the CN via the one or more ANs, providing connectivity to the one or more DNs, each PDU session comprising a respective PDU session identifier (ID). The CN is configured to signal the UE, via the one or more ANs, an established PDU session, wherein the established PDU session is identified by a PDU session ID and at least one PDU session group ID. The same PDU session group ID is assigned to different PDU sessions and indicates that the different PDU sessions belong together.

21 Claims, 2 Drawing Sheets

(56) References Cited

U.S. PATENT DOCUMENTS

| | | | |
|---|---|---|---|
| 2019/0098536 A1 | | 3/2019 | Qiao et al. |
| 2019/0166467 A1* | | 5/2019 | Livanos ................ H04W 8/186 |
| 2019/0261260 A1* | | 8/2019 | Dao ......................... H04W 8/20 |
| 2019/0274178 A1* | | 9/2019 | Salkintzis ............. H04W 76/16 |
| 2020/0107230 A1* | | 4/2020 | Zhao ................... H04W 36/144 |
| 2020/0374352 A1 | | 11/2020 | Ge et al. |
| 2021/0274571 A1* | | 9/2021 | Kawasaki ............. H04W 8/186 |
| 2022/0210698 A1* | | 6/2022 | Ly ........................... H04L 67/34 |
| 2022/0210848 A1 | | 6/2022 | Suh et al. |
| 2022/0256417 A1* | | 8/2022 | Ianev ................... H04W 36/13 |
| 2023/0292391 A1* | | 9/2023 | Mochizuki ........... H04W 76/34 |

FOREIGN PATENT DOCUMENTS

| | | |
|---|---|---|
| WO | WO 2019011398 A1 | 1/2019 |
| WO | WO 2019157893 A1 | 8/2019 |
| WO | WO 2020147019 A1 | 7/2020 |
| WO | WO 2020204518 A1 | 10/2020 |

OTHER PUBLICATIONS

3GPP Draft, Study on 5GS Enhanced support of Vertical and LAN Services (Release 16), 23734-040_MCCclean, Dec 7, 2018, 3rd Generation Partnership Project (3GPP), Dec. 7, 2018 (Dec. 7, 2018), pp. 1-106, Mobile Competence Centre; 650, route des Lucioles; F-06921 Sophia-Antipolis Cedex; France, XP051535243, Retrieved from the Internet: URL: http://www.3gpp.org/ftp/tsg%5Fsa/WG2%5FArch/Latest%5FSA2%5FSpecs/Latest%5Fdraft%5FS2%5FSpecs/23734%2D040%2Ezip, [retrieved on Dec. 7, 2018].

China Mobile, "Solution for introducing one DNN associated with multiple 5G LAN groups", 3GPP Draft; S2-1903714—Apr. 2, 2019, 3rd Generation Partnership Project (3GPP), Apr. 2, 2019 (Apr. 2, 2019), pp. 1-2, vol. SA WG2, No. Xi'an, China; Apr. 8, 2019-Apr. 12, 2019, Mobile Competence Centre; 650, route des Lucioles; F-06921 Sophia-Antipolis Cedex; France, XP051719860, Retrieved from the Internet: URL:http://www.3gpp.org/ftp/tsg%5Fsa/WG2%5FArch/TSGS2%5FI32%5FXiAn/Docs/S2%2DI903714%2Ezip, [retrieved on Apr. 2, 2019].

\* cited by examiner

GROUPING AND PRIORITIZING OF DISSIMILAR PDU SESSIONS IN A TELECOMMUNICATIONS SYSTEM

CROSS-REFERENCE TO PRIOR APPLICATIONS

This application is a U.S. National Phase application under 35 U.S.C. § 371 of International Application No. PCT/EP2022/067153, filed on Jun. 23, 2022, and claims benefit to European Patent Application No. EP 21183188.8, filed on Jul. 1, 2021. The International Application was published in English on Jan. 5, 2023 as WO 2023/274831 A1 under PCT Article 21(2).

FIELD

The invention relates to a method for grouping and prioritizing of dissimilar protocol data unit (PDU) sessions in a telecommunications system and a telecommunications system thereof.

BACKGROUND

In the current 5G system a mobile network is typically divided in two main parts: access network (AN) and core network (CN). FIG. 1 shows an exemplary 5G system comprising a user equipment (UE) 10, a radio access network 20 (RAN), a CN 30 and a data network (DN) 40, such as for example the Internet.

A mobile network provides the UE with connectivity towards a DN. Currently, to do so, the UE communicates with the RAN via a radio interface, which is used for conveying both signaling information and data traffic. In more detail, even in the case where there is a logical separation (logical channels), both types of data are transmitted over the same physical medium.

Between the RAN and the CN, signaling information, so-called control plane (CP), and user data, so-called user plane (UP), are separated in different interfaces: N1/N2 and N3 in the 5G case, the former running on an SCTP/NG-AP/NAS protocol stack and the latter running on a UDP/GTPU-U protocol stack. This is shown in FIG. 2, which illustrates an exemplary data transmission between the UE 10 and the DN 40.

In FIG. 2, the UE 10 is connected through the Uu interface to the gNB at the RAN. The gNB is connected, on the control plane, to the access and mobility management function (AMF) of the CN 30 via the N1/N2 interface. Further, on the user plane, the gNB is connected to the user plane function (UPF) via the N3 interface. The UPF is connected to the DN 40, on the user plane, via the N6 interface.

In order to establish a data connection for enabling a UE to communicate with a DN, a PDU session is required. A PDU session is a logical data transport channel terminated at the CN that provides connectivity to a DN. The termination point of a given PDU session (UPF in the case of FIG. 2 and current state-of-the-art in 5G) is referred to as PDU session anchor (PSA). A PDU session has an associated quality-of-service (QOS) or set of QoS, as several QoS flows can be contained within the PDU session.

While a UE moves (e.g. handover), the PSA typically remains constant (hence the term "anchor").

FIG. 3 illustrates an example of the PDU session establishment process according to the 3GPP specification. As shown in FIG. 3, PDU session establishment is performed by the UE 10 via the radio interface. The RAN 20 is aware of PDU sessions because it needs the information to, for example, do physical resource allocation on Uu, but the PDU session is managed by the CN 30.

In FIG. 3, the UE sends (S1) a PDU session establishment request to the AMF through the gNB, via the Uu and N1/N2 interfaces (see FIG. 2).

The AMF exchanges (S2A) messages with the UPF to establish a N3 data path between the gNB and the UPF. The exchange of messages may involve other network functions (NFs) (e.g. session management function (SMF), policy control function (PCF)). Then, the AMF exchanges messages (S2B) with the gNB to establish an N3 data path between the gNB and the UPF.

The AMF sends (S3) a PDU session establishment response to the UE 1 via the gNB.

Lastly, data traffic is: exchanged (S4A) between the UE 1 and gNB via the Uu interface (radio): exchanged (S4B) between the gNB and the UPF via the N3 interface (GTP-U tunnel); and exchanged (S4C) between the UPF and the DN 40 via the N6 interface (unencapsulated).

Currently, distinct PDU sessions are regarded as independent, i.e. a PDU session is not linked to other PDU sessions.

However, according to the state of the art, it is not possible to group certain PDU sessions belonging to a UE so that the access network (AN) and/or the core network (CN) are informed that certain PDU sessions, albeit being dissimilar (i.e. they are not redundant PDU sessions) have to be treated as a group.

In particular, current limitations include, for example, that a PDU session is always associated with a given single-network slice selection assistance information (S-NSSAI, i.e. "slice ID") and data network name (DNN). Thus, connectivity to different DNNs, potentially over different slices, requires several PDU sessions, even if said connectivity is established to support a single application.

Furthermore, while several QoS flows can exist within a given PDU session, they are all linked to the same PDU session, thus to the same S-NSSAI/DNN.

SUMMARY

In an exemplary embodiment, the present invention provides a telecommunications system. The system includes: a user equipment: one or more access networks (ANs): a core network (CN); and one or more data networks (DNs). The one or more ANs are configured to provide the UE access to the CN. The CN is configured to provide connectivity to the one or more DNs. The UE is configured to access the one or more DNs by using different protocol data unit (PDU) sessions, established between the UE and the CN via the one or more ANs, providing connectivity to the one or more DNs, each PDU session comprising a respective PDU session identifier (ID). The CN is configured to signal the UE, via the one or more ANs, an established PDU session, wherein the established PDU session is identified by a PDU session ID and at least one PDU session group ID. The same PDU session group ID is assigned to different PDU sessions and indicates that the different PDU sessions belong together.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
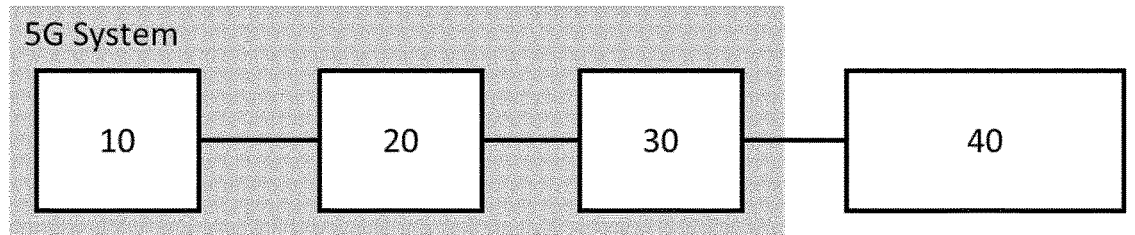
FIG. 1 illustrates an exemplary 5G system.
Figure 2:
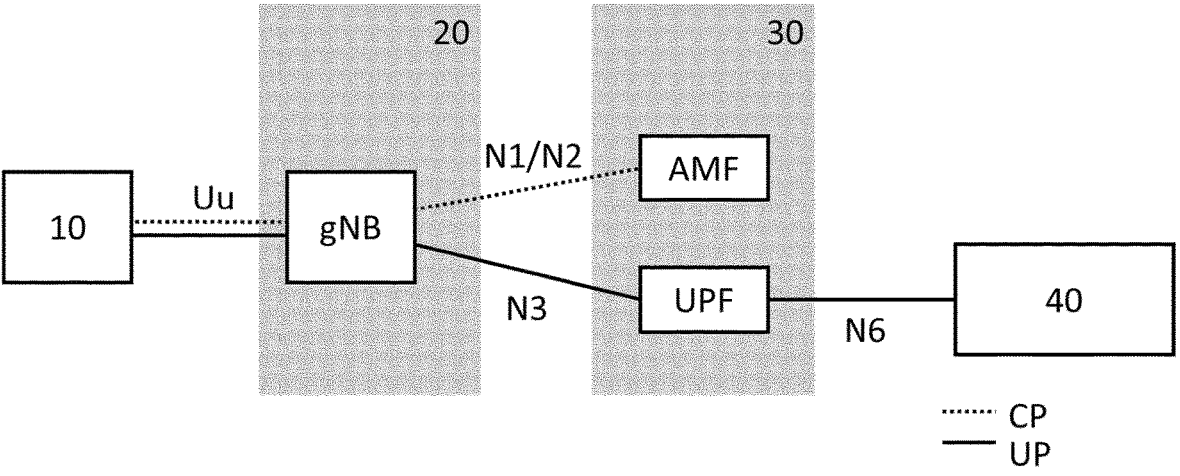
FIG. 2 illustrates an exemplary data transmission between UE and DN.
Figure 3:
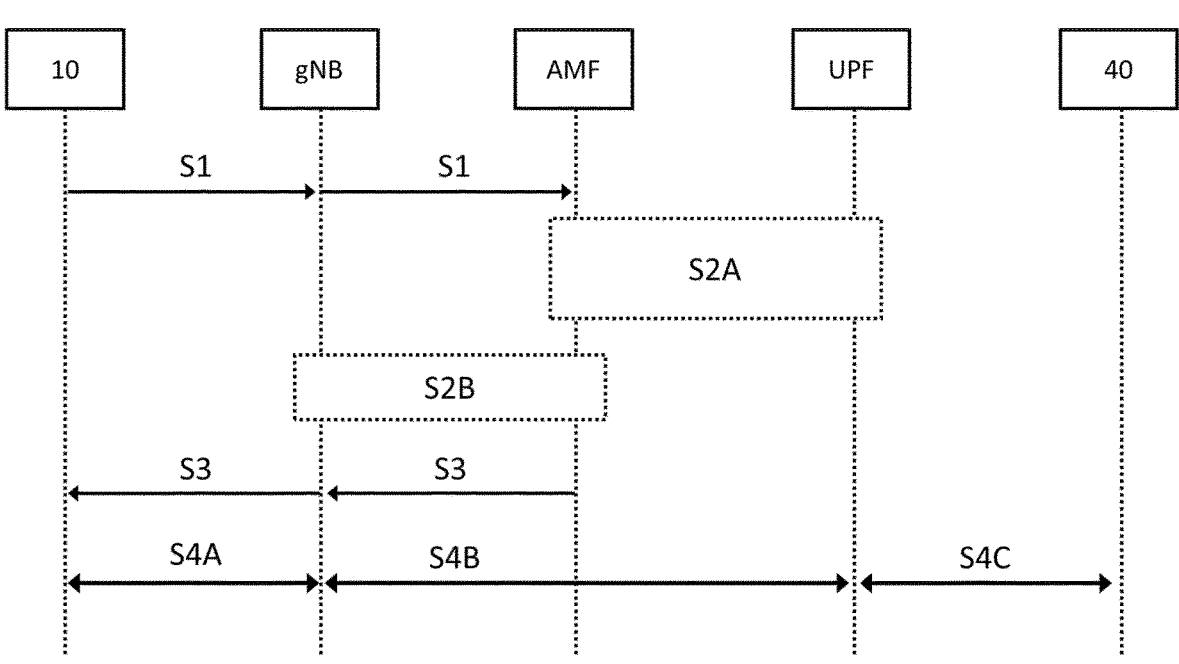
FIG. 3 illustrates an exemplary PDU session establishment process according to the 3GPP.
Figure 4:
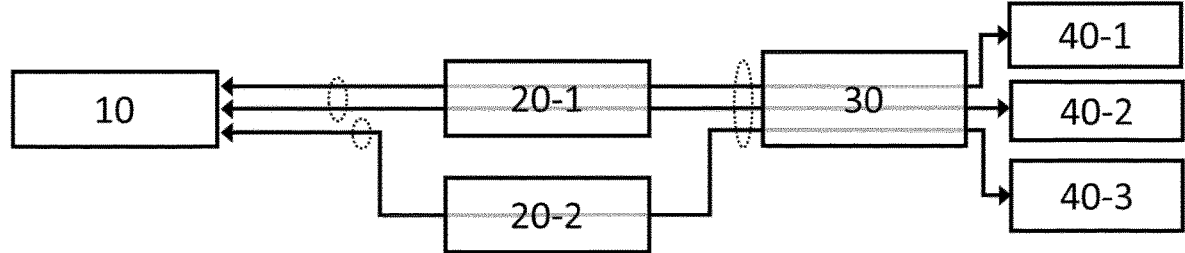
FIG. 4 illustrates several PDU sessions grouped by means of PDU session group ID according to an embodiment of the present invention.

In view of the above, exemplary embodiments of the present invention provide a method and system for enabling the grouping of dissimilar PDU sessions. So as to enable other network components (e.g. AN, CN) to jointly consider said PDU sessions for system procedures such as mobility, release (e.g. move/release PDU sessions in a linked manner).

According to an aspect of the invention, there is provided a telecommunications system comprising: a user equipment (UE): one or more access networks (ANs): a core network (CN); and one or more data networks (DNS), wherein the AN or ANs is configured to provide the UE access to the CN: the CN is configured to provide connectivity to the one or more data networks (DNS): the UE is configured to access the DNs by using different protocol data unit (PDU) sessions, established between the UE and the CN via the AN or ANs, providing connectivity to one or more DNs, each PDU session comprising a PDU session identifier: the CN is configured to signal the UE, via the AN or ANs, an established PDU session, wherein the established PDU session is identified by a PDU session identifier, ID, and at least one PDU session group ID, wherein the PDU session group identifier is the same assigned to one or more dissimilar PDU sessions and indicates that said one or more different PDU sessions belong together.

According to a preferred aspect, each PDU session may include a priority identifier for identifying, within a given PDU session group, a priority of a given PDU session.

According to a preferred aspect, the UE may be configured to request a PDU session by sending a PDU session establishment request message to the CN, via the AN or ANs, the request comprising: a previously received PDU session group ID, or an indication that a new PDU session group ID should be provided by the CN, and optionally, a priority identifier within the PDU session group.

According to a preferred aspect, the PDU session group ID may further comprise a related PDU session group purpose ID for identifying the usage and/or purpose of the PDU session group.

According to a preferred aspect, the UE may be configured to trigger a release of all PDU sessions within a PDU session group by sending a message to the CN, via the AN or ANs, indicating at least the PDU session group ID and an indication to release.

According to a preferred aspect, prior to the PDU session establishment the UE may be configured to register to the CN via the AN or ANs, and the UE is configured to inform the CN about its capability for supporting PDU session groups.

According to a preferred aspect, the AN may be configured to use the PDU session group information to steer UE mobility.

According to another aspect of the invention, there is provided a method for grouping dissimilar PDU sessions in a telecommunications system comprising: a user equipment (UE): one or more access networks (ANs): a core network (CN); and one or more data networks (DNS), the method comprising: providing, by the AN or ANs to the UE, access to the CN: providing, by the CN to the UE, connectivity to the one or more data networks (DNS): accessing, by the UE, the DNs by using dissimilar protocol data unit (PDU) sessions, established between the UE and the CN via the AN or ANs, providing connectivity to one or more DNs, each PDU session comprising a PDU session identifier; and signaling, by the CN to the UE via the AN or ANs, an established PDU session, wherein the established PDU session is identified by a PDU session identifier, ID, and at least one PDU session group ID, wherein the PDU session group identifier is the same assigned to one or more dissimilar PDU sessions and indicates that said one or more different PDU sessions belong together.

According to a preferred aspect, each PDU session may include a priority identifier for identifying, within a given PDU session group, a priority of a given PDU session.

According to a preferred aspect, the method may further comprise requesting, by the UE, a PDU session by sending a PDU session establishment request message to the CN via the AN or ANs, the request comprising: a previously received PDU session group ID, or an indication that a new PDU session group ID should be provided by the CN, and optionally, a priority identifier within the PDU session group.

According to a preferred aspect, the PDU session group ID may further comprise a related PDU session group purpose ID for identifying the usage and/or purpose of the PDU session group.

According to a preferred aspect, the method may further comprise: triggering, by the UE, a release of all PDU sessions within a PDU session group by sending a message to the CN via the AN or ANs, indicating at least the PDU session group ID and an indication to release.

According to a preferred aspect, prior to the PDU session establishment the method may further comprise registering, by the UE, to the CN via the AN or ANs; and informing, by the UE to the CN, about its capability for supporting PDU session groups.

According to a preferred aspect, the method may further comprise using, by the AN or ANs, the PDU session group information to steer UE mobility.

Other aspects, features, and advantages will be apparent from the summary above, as well as from the description that follows, including the figures and the claims.

According to an embodiment of the invention, the PDU session establishment process includes the addition to the PDU session establishment of an indication that the PDU session is a grouped PDU session: a PDU session group ID; and/or a request of a new PDU session group ID. Said indications are considered as part of the PDU session establishment request and/or steered by the network.

According to an embodiment of the invention, a telecommunications system comprises: a user equipment (UE) 10: one or more access networks (ANs) 20: a core network (CN) 30; and one or more data networks (DNS) 40-1, 40-2, 40-3.

The AN 20-1 or 20-2 provides the UE 10 with access to the CN 30. At the same time, the CN 30 provides connectivity to the one or more DNs 40-1, 40-2, 40-3.

The UE 10 accesses the DNs 40-1, 40-2, 40-3 by using different protocol data unit (PDU) sessions, established between the UE 10 and the CN 30 via the AN 20. The PDU sessions provide connectivity to the one or more DNs 40-1, 40-2, 40-3. In addition, each PDU session comprises a PDU session identifier.

The CN 30 signals the UE 10, via the AN 20, an established PDU session. The established PDU session is identified by a PDU session identifier (ID) and at least one PDU session group ID.

Besides, the PDU session group identifier can be the same assigned to one or more dissimilar PDU sessions and indicates that said one or more different PDU sessions belong together.

Optionally, each PDU session may also include a priority identifier for identifying, within a given PDU session group, a priority of a given PDU session.

Optionally, the UE may request a PDU session by sending a PDU session establishment request message to the CN, via the AN. In this case, the request may comprise: a previously received PDU session group ID, or an indication that a new PDU session group ID should be provided by the CN, and optionally, a priority identifier within the PDU session group.

Optionally, the PDU session group ID may further comprise a related PDU session group purpose ID for identifying the usage and/or purpose of the PDU session group.

Optionally, the UE 10 can trigger a release of all PDU sessions within a PDU session group by sending a message to the CN 30, via the AN 20. For example, the message may include at least the PDU session group ID and an indication to release.

Optionally, prior to the PDU session establishment, the UE may register to the CN 30 via the AN 20. Thereafter, the UE 10 may inform the CN 30 about its capability for supporting PDU session groups.

Optionally, the AN 20 may use the PDU session group information to steer UE 10 mobility.

According to the invention, several advantageous technical effects may be achieved, such as allowing the 5GS components (RAN, CN) to be aware that a PDU session (regardless of the QoS level requested, i.e. latency, packet loss) is used for backhauling data belonging to a specific application (e.g. an edge application deployed at the UE). In particular, for the CN, different PDU sessions could reach the CN from different ANs (e.g. private 5G-NR and Public Land Mobile Networks (PLMNs) 5G-NR or PLMN and/or WiFi). In this case, the CN can be aware of specific PDU sessions from a given UE belonging together. The method can be generalized to PDU session groups spanning more than one UE (e.g. an application connected via two separate UEs). In the AN side, it enables the AN to use the PDU session group information to, for example, steer mobility, resource allocation (all PDU sessions in a group scheduled in the same frequency, handover always in the same group, etc.).

Still further, according to the invention, when managing several PDU sessions, it is possible to treat them as a group that belongs together. In typical applications, if one of the networks breaks, the application connectivity is irretrievable broken. Accordingly, the networks can take this into consideration when, for example, terminating PDU session(s) from the network side. This is an important aspect since there exist some cases when the network should be aware that certain resources/logical connections are to be kept apart such as, for example, for resiliency purposes.

Still further, the PDU Session group ID (or information also contained in the identifier) can indicate the purpose of the group such as, for example, that the group is used for data backhauling.

Still further, the use of PDU session grouping advantageously allows applications requiring different QoS flows and connectivity to different data network names (DNNs) (within one DNN, it is possible to use QoS flows within a PDU session) to group PDU sessions.

Still further, it is possible to introduce a hierarchy within PDU session groups.

Still further, it is possible to advantageously enable several applications such as: edge applications deployed at the UE, where several backhaul connections are required: Vehicle-to-everything (V2X) applications with simultaneous connectivity to several services; and/or relayed PDU sessions coming from a similar location.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A telecommunications system, comprising:
a user equipment (UE);
one or more access networks (ANs);
a core network (CN); and
one or more data networks (DNS);
wherein the one or more ANs are configured to provide the UE access to the CN;
wherein the CN is configured to provide connectivity to the one or more DNs;
wherein the UE is configured to access the one or more DNs by using different protocol data unit (PDU) sessions, established between the UE and the CN via the one or more ANs, providing connectivity to the one or more DNs, each PDU session comprising a respective PDU session identifier (ID);
wherein the CN is configured to signal the UE, via the one or more ANs, an established PDU session identified by a PDU session ID and a PDU session group ID;
wherein the PDU session group ID is assignable to a plurality of different PDU sessions to indicate that the plurality of different PDU sessions belong together; and
wherein the one or more ANs are configured to use the PDU session group ID to steer UE mobility.

2. The telecommunications system of claim 1, wherein each respective PDU session includes a respective priority identifier for identifying, within a given PDU session group, a respective priority of the respective PDU session.

3. The telecommunications system of claim 1, wherein the UE is configured to request a PDU session by sending a PDU session establishment request message to the CN, via the one or more ANs, the request comprising a previously received PDU session group ID.

4. The telecommunications system of claim 1, wherein the UE is configured to request a PDU session by sending a PDU session establishment request message to the CN, via the one or more ANs, the request comprising an indication that a new PDU session group ID should be provided by the CN.

5. The telecommunications system of claim 1, wherein the PDU session group ID comprises a related PDU session group purpose ID for identifying a usage of the PDU session group.

6. The telecommunications system of claim 1, wherein the PDU session group ID comprises a related PDU session group purpose ID for identifying a purpose of the PDU session group.

7. The telecommunications system of claim 1, wherein the PDU session group ID comprises a related PDU session group purpose ID for identifying a usage and a purpose of the PDU session group.

8. The telecommunications system of claim 1, wherein the PDU session ID comprises the PDU session group ID.

9. The telecommunications system of claim 1, wherein the UE is configured to trigger a release of all PDU sessions within a PDU session group by sending a message to the CN, via the one or more ANs, indicating at least the PDU session group ID and an indication to release.

10. The telecommunications system of claim 1, wherein prior to PDU session establishment the UE is configured to register to the CN via the one or more ANs, and the UE is configured to inform the CN about its capability for supporting PDU session groups.

11. The telecommunications system of claim 1, wherein PDU sessions assigned a given PDU session group ID are assigned to two or more UEs.

12. A method for grouping protocol data unit (PDU) sessions in a telecommunications system, the method comprising:
providing, by one or more access networks (ANs) of the telecommunications system to a user equipment (UE) of the telecommunications system, access to a core network (CN) of the telecommunications system;
providing, by the CN to the UE, connectivity to one or more data networks (DNs) of the telecommunications system;
accessing, by the UE, the one or more DNs by using different PDU sessions, established between the UE and the CN via the one or more ANs, providing connectivity to one or more DNs, each PDU session comprising a respective PDU session identifier (ID); and
signaling, by the CN to the UE via the one or more ANs, an established PDU session identified by a PDU session ID and a PDU session group ID;
wherein the PDU session group ID is assignable to a plurality of different PDU sessions to indicate that the plurality of different PDU sessions belong together; and
wherein the method further comprises: using, by the one or more ANs, the PDU session group ID to steer UE mobility.

13. The method of claim 12, wherein each respective PDU session includes a priority identifier for identifying, within a given PDU session group, a respective priority of the respective PDU session.

14. The method of claim 12, further comprising:
requesting, by the UE, a PDU session by sending a PDU session establishment request message to the CN via the one or more ANs, the request comprising a previously received PDU session group ID.

15. The method of claim 12, further comprising:
requesting, by the UE, a PDU session by sending a PDU session establishment request message to the CN via the one or more ANs, the request comprising an indication that a new PDU session group ID should be provided by the CN.

16. The method of claim 12, wherein the PDU session group ID comprises a related PDU session group purpose ID for identifying a usage of the PDU session group.

17. The method of claim 12, wherein the PDU session group ID comprises a related PDU session group purpose ID for identifying a purpose of the PDU session group.

18. The method of claim 12, wherein the PDU session group ID comprises a related PDU session group purpose ID for identifying a usage and a purpose of the PDU session group.

19. The method of claim 12, wherein the PDU session ID comprises the PDU session group ID.

20. The method of claim 12, further comprising:
triggering, by the UE, a release of all PDU sessions within a PDU session group by sending a message to the CN via the one or more ANs, indicating at least the PDU session group ID and an indication to release.

21. The method of claim 12, wherein prior to PDU session establishment the method comprises:

registering, by the UE, to the CN via the one or more ANs; and informing, by the UE to the CN, about its capability for supporting PDU session groups.

* * * * *